United States Patent
Hong et al.

(10) Patent No.: US 9,494,838 B2
(45) Date of Patent: Nov. 15, 2016

(54) LIQUID CRYSTAL DISPLAY DEVICE

(71) Applicant: Samsung Display Co., Ltd., Yongin, Gyeonggi-Do (KR)

(72) Inventors: Ki Pyo Hong, Hwaseong-si (KR); Hyung Gi Jung, Cheonan-si (KR); Sang Woo Whangbo, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/741,053

(22) Filed: Jun. 16, 2015

(65) Prior Publication Data

US 2016/0216543 A1 Jul. 28, 2016

(30) Foreign Application Priority Data

Jan. 22, 2015 (KR) .................. 10-2015-0010839

(51) Int. Cl.
*G02F 1/1335* (2006.01)
*G02F 1/1368* (2006.01)
*G02F 1/1362* (2006.01)
*G02F 1/1339* (2006.01)

(52) U.S. Cl.
CPC .......... *G02F 1/1368* (2013.01); *G02F 1/1339* (2013.01); *G02F 1/136209* (2013.01); *G02F 1/136227* (2013.01); *G02F 2001/13396* (2013.01); *G02F 2001/136218* (2013.01); *G02F 2001/136222* (2013.01)

(58) Field of Classification Search
CPC .................................................... G02F 1/1335
See application file for complete search history.

(56) References Cited

U.S. PATENT DOCUMENTS

| 7,920,243 B2* | 4/2011 | Lee | G02F 1/13394 349/106 |
|---|---|---|---|
| 2004/0100611 A1 | 5/2004 | Song | |
| 2014/0293199 A1* | 10/2014 | Sakae | G02F 1/134363 349/106 |
| 2014/0375936 A1* | 12/2014 | Park | G02F 1/13394 349/106 |
| 2015/0029430 A1* | 1/2015 | Song | G02F 1/133707 349/43 |
| 2015/0036081 A1* | 2/2015 | Beon | G02F 1/133528 349/96 |

(Continued)

FOREIGN PATENT DOCUMENTS

| JP | 2011-048170 | 3/2011 |
|---|---|---|
| KR | 10-2011-0100842 | 9/2011 |
| KR | 10-2014-0058773 | 5/2014 |

*Primary Examiner* — Timothy L Rude
(74) *Attorney, Agent, or Firm* — Innovation Counsel LLP (57) ABSTRACT

A liquid crystal display device includes: a first substrate including a first light blocking region where a plurality of transistors are formed and a second light blocking region where a data line is extended in a vertical direction; a first color filter and a second color filter formed on the first substrate; a second substrate facing the first substrate and having a common electrode formed thereon; and a liquid crystal layer interposed between the first and second substrates, wherein the first and second color filters are spaced apart from each other in an intersection region of the first and second light blocking regions and are overlapped with each other in the second light blocking region other than the intersection region to form a color filter overlapped part in the vertical direction.

10 Claims, 7 Drawing Sheets

(56) References Cited

U.S. PATENT DOCUMENTS

| | | | |
|---|---|---|---|
| 2015/0042914 A1* | 2/2015 | Cho | G02F 1/136286 |
| | | | 349/43 |
| 2015/0070638 A1* | 3/2015 | Lee | G02F 1/13363 |
| | | | 349/110 |
| 2015/0200211 A1* | 7/2015 | Hong | H01L 27/1222 |
| | | | 349/43 |
| 2015/0236041 A1* | 8/2015 | Kim | H01L 27/1248 |
| | | | 257/72 |
| 2016/0013250 A1* | 1/2016 | Kim | H01L 27/3213 |
| | | | 257/40 |
| 2016/0026049 A1* | 1/2016 | Park | H01L 27/124 |
| | | | 257/72 |
| 2016/0033814 A1* | 2/2016 | Na | G02F 1/133305 |
| | | | 349/106 |

\* cited by examiner

LIQUID CRYSTAL DISPLAY DEVICE

CROSS-REFERENCE TO RELATED APPLICATION

This application claims priority to and the benefit of Korean Patent Application No. 10-2015-0010839 filed in the Korean Intellectual Property Office on Jan. 22, 2015, the entire contents of which are incorporated herein by reference.

BACKGROUND (a) Related Field

The present disclosure relates to a liquid crystal display device.

(b) Description of the Related Art

A liquid crystal display device is a flat panel display device that is currently used widely and generally including two display panels on which electrodes are formed and a liquid crystal layer interposed between the two display panels. By applying a voltage to the electrodes to rearrange the liquid crystal molecules of the liquid crystal layer, the liquid crystal display device adjusts the amount of light transmitted by the liquid crystal layer to display an image.

A liquid crystal display device may have a structure in which electric field generating electrodes are provided on the two display panels. Particularly, a liquid crystal display device may have a structure in which a plurality of thin film transistors and pixel electrodes are arranged in a matrix form on a lower display panel (thin film transistor display panel), color filters of a red, a green and a blue color are formed on an upper display panel (common electrode display panel), and a common electrode covers an entire surface of the upper display panel.

However, in this liquid crystal display device, since the pixel electrodes and the color filters are formed on different substrates, it is difficult to accurately align the pixel electrodes and the color filters with each other, such that an alignment error may occur. To solve this problem, a structure (color filter on array (COA)) in which the color filters and the pixel electrodes are formed on the same substrate has been suggested.

In addition, because the upper display panel and the lower display panel are to be bonded to each other, a bonding margin is considered, and thus, a light blocking member, such as a black matrix, is usually manufactured at a size larger than a predetermined size. However, in this case, since an aperture ratio is decreased due to the increased size of the black matrix, the black matrix may be formed on the lower display panel.

A gap of the liquid crystal layer between the above-mentioned two display panels is called a cell gap and influences the general operation characteristics of the liquid crystal display device, such as its response speed, contrast ratio, viewing angle, luminance uniformity, and the like. When the cell gap is not constant, an image is not uniformly displayed over the entire screen, which causes deteriorated image quality. Therefore, to form and maintain a uniform cell gap over the entire region of the display panel, a plurality of spacers are formed on at least one of the two display panels.

The plurality of spacers may include a main-column spacer substantially supporting the two display panels and a sub-column spacer assisting in the role of the main-column space.

To simplify the manufacturing process, the light blocking member, such as the black matrix, and the spacers may be simultaneously formed by implementing a multi-step. To implement the multi-step, a mask capable of implementing a multi-transmittance and a material capable of implementing the multi-step are used. However, currently, there is a limitation in implementing the multi-transmittance in the mask, and the material capable of implementing the multi-step has not been developed until now.

Generally, a step difference between the main-column spacer and the sub-column spacer implemented using a current material is about 0.5 μm, and a density ratio of the column spaces should be accurately implemented so as to have a process margin for an active unfilled area (AUA) defect during a period in which a liquid crystal process is performed.

However, in the case in which a step protruding by a height corresponding to the column spacer is present in a region other than the main-column spacer and the sub-column spacer, the step serves as the sub-column spacer, such that entire density of the main-column spacer and the sub-column spacer is changed. This may cause a problem in a liquid crystal margin at a low temperature.

Therefore, it is important to sufficiently secure the cell gap in portions other than the spacers.

The above information disclosed in this Background section is only for enhancement of understanding of the background of the disclosure and therefore may contain information that does not form the prior art that is already known in this country to a person of ordinary skill in the art.

SUMMARY

The present disclosure provides a liquid crystal display device having advantages of preventing a light leakage phenomenon and sufficiently securing a cell gap in portions other than spacers.

An exemplary embodiment of the present disclosure provides a liquid crystal display device including: a first substrate including a first light blocking region where a plurality of transistors are formed and a second light blocking region where a data line is extended in a vertical direction; a first color filter and a second color filter formed on the first substrate; a second substrate facing the first substrate and having a common electrode formed thereon; and a liquid crystal layer interposed between the first and second substrates, wherein the first and second color filters are spaced apart from each other in an intersection region of the first and second light blocking regions and are overlapped with each other in the second light blocking region other than the intersection region to form a color filter overlapped part in the vertical direction.

The first substrate may further include a light blocking member extended in a horizontal direction so as to cover the first light blocking region.

The first substrate may further include a shielding electrode extended in the vertical direction so as to cover the second light blocking region.

The shielding electrode may be interposed between the data line and the common electrode.

The shielding electrode may include an extension part in the horizontal direction in the region where the first and second color filters are spaced apart from each other.

The first and second color filters may each include a contact hole adjacent to the shielding electrode, and the extension part may be formed so as to cover the contact hole.

The contact hole may be extended from a region where the contact hole is overlapped with the extension part to boundary regions.

The shielding electrode may be electrically connected to the plurality of transistors through the contact hole.

The liquid crystal display device may further include: a first spacer supporting the first and second substrate; and a second spacer having a height lower than that of the first spacer, wherein a height of a region of the first substrate where the light blocking member is formed is lower than a height at which the second spacer is formed.

The first spacer, the second spacer, and the light blocking member may be made of the same material.

According to an exemplary embodiment of the present system and method, the liquid crystal display prevents the light leakage phenomenon and sufficiently secures the cell gaps of portions other than spacers.

DETAILED DESCRIPTION OF THE EMBODIMENTS

Hereinafter, exemplary embodiments of the present system and method are described more fully with reference to the accompanying drawings so as to be easily practiced by those of ordinary skill in the art to which the present system and method pertain. As those skilled in the art would realize, the described embodiments may be modified in various different ways, all without departing from the spirit or scope of the present system and method.

In the drawings, the thickness of layers, films, panels, regions, etc., is exaggerated for clarity. Like reference numerals designate like elements throughout the specification. When an element, such as a layer, film, region, or substrate, is referred to as being "on" another element, it may be directly on the other element, or intervening elements may also be present. In contrast, when an element is referred to as being "directly on" another element, there are no intervening elements present.

Figure 1:
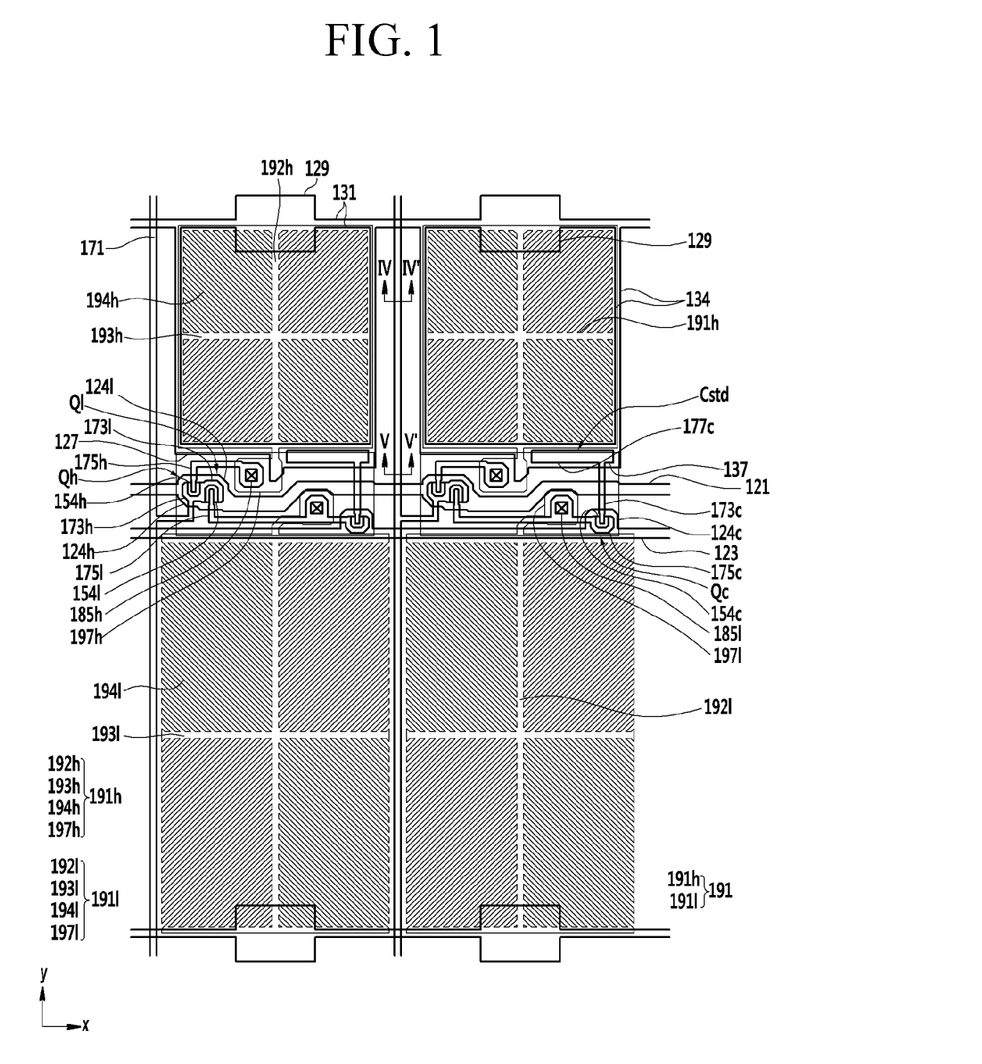
FIG. 1 is a view showing a plurality of pixels of a liquid crystal display device according to an exemplary embodiment of the present system and method.
Figure 2:
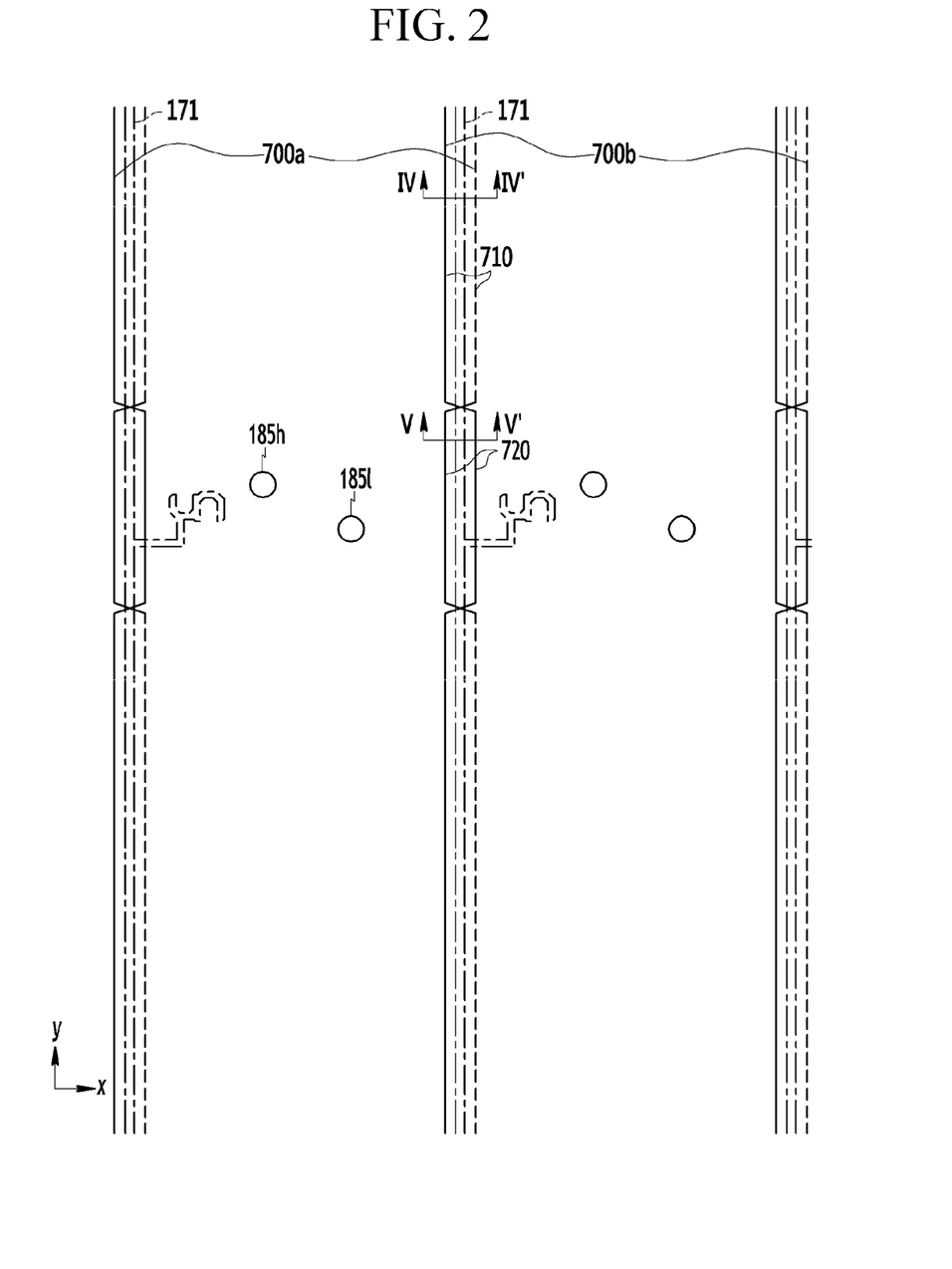
FIG. 2 is a view showing color filters formed so as to correspond to the pixels of FIG. 1.
Figure 3:
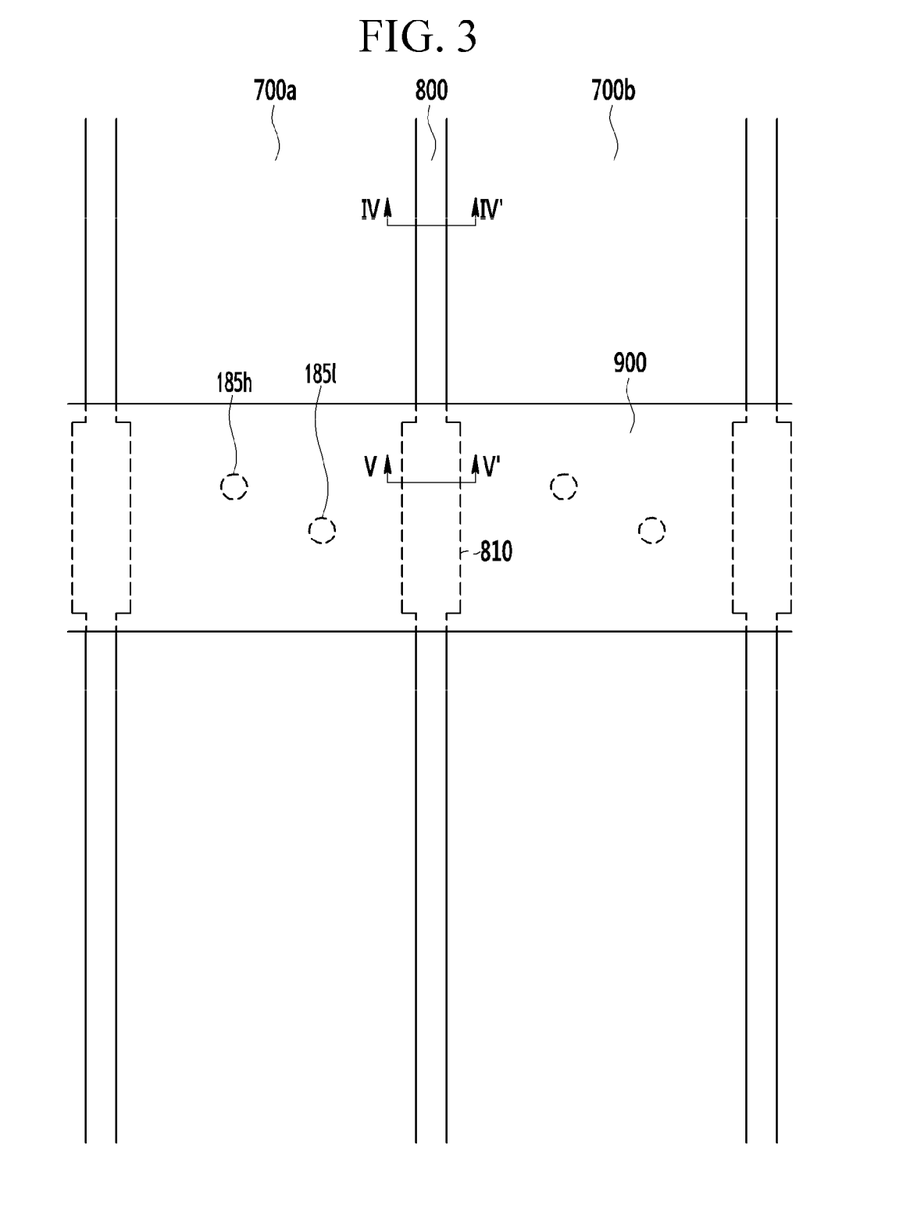
FIG. 3 is a view showing shielding electrodes and light blocking members formed so as to correspond to the color filters of FIG. 2.

In the present system and method, a lower display panel 100 separated into layers is shown in FIGS. 1 to 3 to illustrate an exemplary stack structure of the lower display panel 100.

FIG. 1 shows a plurality of pixels of a liquid crystal display device according to an exemplary embodiment of the present system and method. FIG. 2 shows color filters formed so as to correspond to pixels of FIG. 1. FIG. 3 shows shielding electrodes and light blocking members formed so as to correspond to the color filters of FIG. 2.

Figure 4:
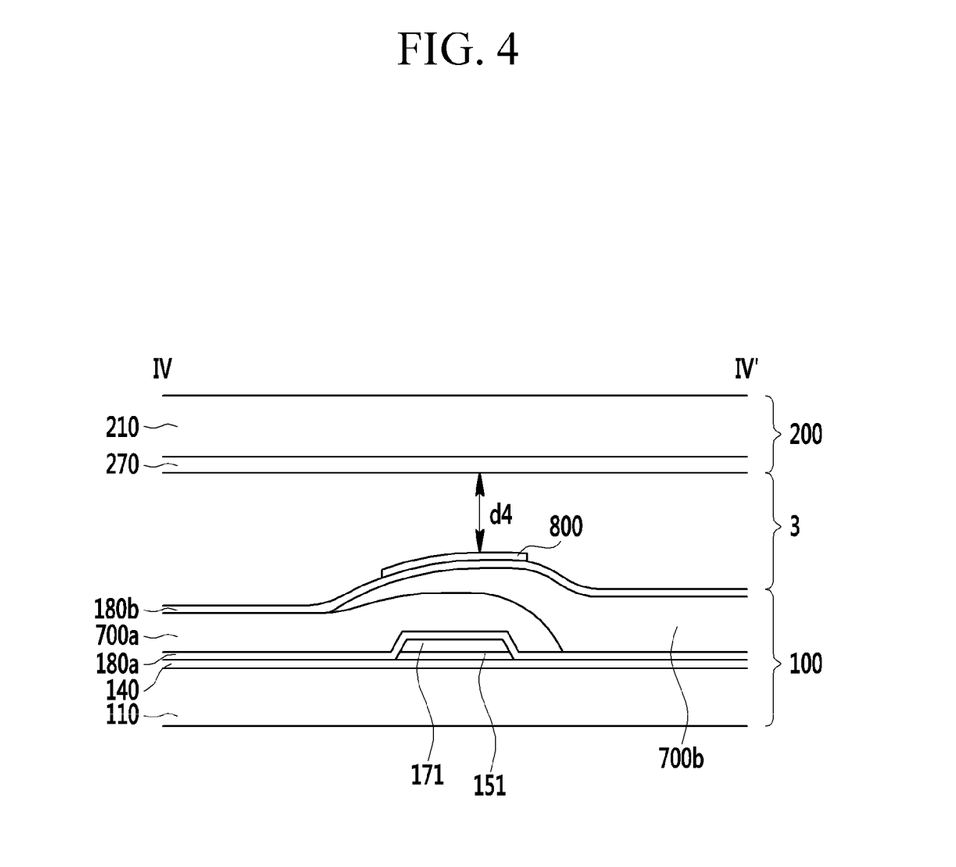
FIG. 4 is a cross-sectional view taken along line IV-IV' of FIG. 1.
Figure 5:
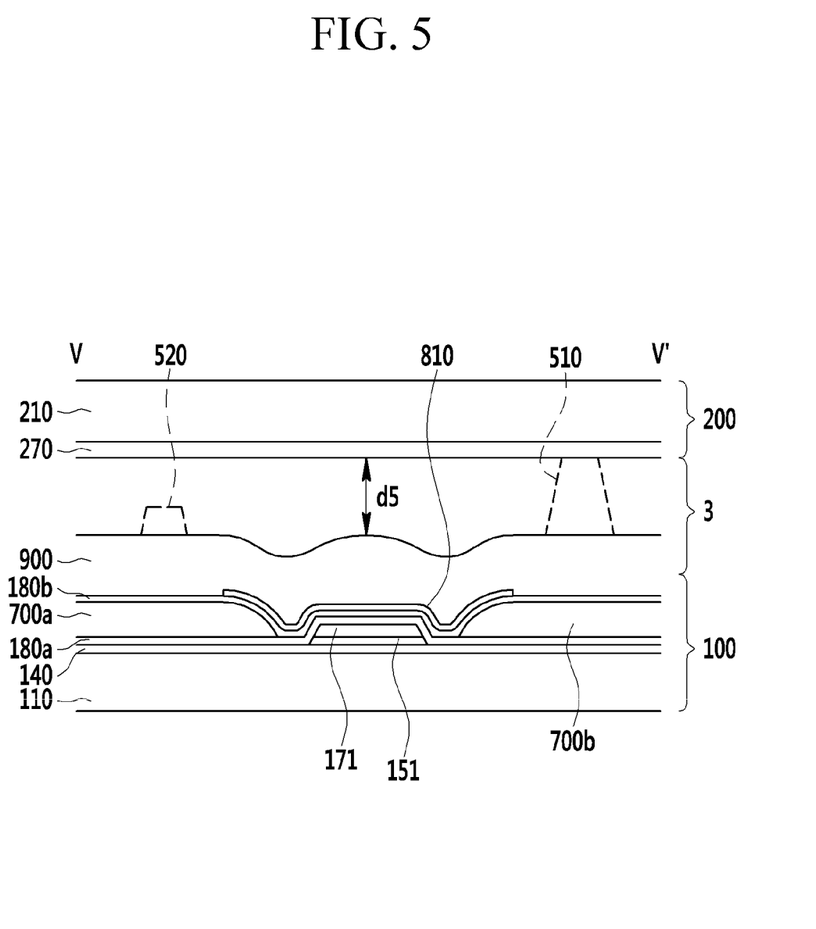
FIG. 5 is a cross-sectional view taken along line V-V' of FIG. 1.

FIGS. 4 and 5 show cross-sectional views taken along lines IV-IV' and V-V', respectively, of FIG. 1.

Referring to FIGS. 1 to 5, the liquid crystal display device according to an exemplary embodiment of the present system and method includes a lower display panel 100 and an upper display panel 200 facing each other, and a liquid crystal layer 3 interposed between the upper and lower display panels.

First, the lower display panel 100 is described below.

A plurality of gate conductors including a plurality of gate lines, including first and second gate lines 121 and 123, and a plurality of sustain electrode lines 131 are formed on a first substrate 110 including a pixel region.

The gate lines 121 and 123 are mainly extended in a horizontal direction and transfer gate signals. As FIG. 1 shows, the first gate line 121 includes a first gate electrode 124*l* and a second gate electrode 124*h* protruding upwardly and downwardly, and the second gate line 123 includes a third gate electrode 124*c* protruding upwardly. The first and second gate electrodes 124*l* and 124*h* are connected to each other to form one protrusion part.

The sustain electrode lines 131 are also mainly extended in the horizontal direction and transfer a predetermined voltage such as a common voltage Vcom, or the like. As FIG. 1 shows, the sustain electrode lines 131 includes sustain electrodes 129 protruding upwardly and downwardly, a pair of vertical parts 134 extended downwardly so as to be substantially perpendicular to the gate lines 121 and 123, and a horizontal part 127 connecting ends of the pair of vertical parts 134 to each other. The horizontal part 127 includes a capacitor electrode 137 extended downwardly.

A gate insulating layer 140 is formed on the gate conductors 121, 123, and 131.

A plurality of linear semiconductors 151, which may be made of amorphous silicon, crystalline silicon, or the like, are formed on the gate insulating layer 140. The linear semiconductors may include first and second semiconductors 154*l* and 154*h* mainly extended in a vertical direction, extended toward the first and second gate electrodes 124*l* and 124*h* and connected to each other, and a third semiconductor 154*c* positioned on the third gate electrode 124*c*.

A plural pairs of ohmic contact members (not shown) are formed on the semiconductors 154*l*, 154*h*, and 154*c*. The ohmic contact member may be made of a material such as a silicide or an n+ hydrogenated amorphous silicon doped with n-type impurities at a high concentration.

Data conductors including a plurality of data lines 171, a plurality of first drain electrodes 175*l*, a plurality of second drain electrodes 175*h*, and a plurality of third drain electrodes 175*c* are formed on the ohmic contact members.

The data lines 171 transfer data signals and are mainly extended in the vertical (y) direction to intersect with the gate lines 121 and 123. The respective data lines 171 include first and second source electrodes 173*l* and 173*h* that are connected to each other and that overlap the first gate electrode 124*l* and the second gate electrode 124*h*, respectively.

Each of the first drain electrode 175*l*, the second drain electrode 175*h*, and the third drain electrode 175*c* includes one end portion that is wide and another end portion that has a rod shape. The end portions of the first and second drain electrodes 175*l* and 175*h* having the rod shape are partially enclosed by the first and second source electrodes 173*l* and 173*h*, respectively. The end portion of the first drain electrode 175*l* that is wide is further extended to form the third drain electrode 175c bent in a 'U' shape. The end portion 177c of the third source electrode 173c that is wide is overlapped with the capacitor electrode 137 to form a step-down capacitor Cstd, and the end portion thereof that has the rod shape is partially enclosed by the third drain electrode 175c.

The first gate electrode 124l, the first source electrode 173l, and the first drain electrode 175l form, together with the first semiconductor 154l, a first thin film transistor Ql. The second gate electrode 124h, the second source electrode 173h, and the second drain electrode 175h form, together with the second semiconductor 154h, a second thin film transistor Qh. The third gate electrode 124c, the third source electrode 173c, and the third drain electrode 175c form, together with the third semiconductor 154c, a third thin film transistor Qc.

The linear semiconductors including the first semiconductor 154l, the second semiconductor 154h, and the third semiconductor 154c may have plane shapes that are substantially the same as those of the data conductors 171, 173l, 173h, 173c, 175l, 175h, and 175c and the ohmic contact members disposed therebelow except for the channel regions between the source electrodes 173l, 173h, and 173c and the drain electrodes 175l, 175h, and 175c.

A portion of the first semiconductor 154l between the first source electrode 173l and the first drain electrode 175l is exposed and not covered by the first source electrode 173l and the first drain electrode 175l. A portion of the second semiconductor 154h between the second source electrode 173h and the second drain electrode 175h is exposed and not covered by the second source electrode 173h and the second drain electrode 175h. A portion of the third semiconductor 154c between the third source electrode 173c and the third drain electrode 175c is exposed and not covered by the third source electrode 173c and the third drain electrode 175c.

A first passivation layer 180a, which may be made of an inorganic insulating material such as silicon nitride or silicon oxide, is formed on the data conductors 171, 173l, 173h, 173c, 175l, 175h, and 175c and the exposed portions of the semiconductors 154l, 154h, and 154c.

The first substrate 110 includes a first light blocking region where a plurality of transistors Ql, Qh, and Qc are formed and a second light blocking region where the data lines 171 are extended in the vertical (y) direction.

The first light blocking region, which is a region where the plurality of transistors Ql, Qh, and Qc and various wirings are concentrated, is called a gate region.

The second light blocking region is a region where a light leakage phenomenon may occur since the alignment of the liquid crystal molecules around this region may be affected by an electric field formed between the data line 171 and a common electrode 270.

Thus, according to an exemplary embodiment of the present system and method, the first and second light blocking regions of the display are covered, such as by the cover structure shown in in FIG. 3.

Referring to FIG. 2, a plurality of color filters 700a and 700b are positioned on the first passivation layer 180a. The plurality of color filters 700a and 700b may include a red color filter, a green color filter, and a blue color filter arranged so that adjacent color filters overlap each other at an overlapped part 710 and are spaced apart from each other at a spaced part 720. However, the color of the color filters may be varied depending on the colors to be displayed by the display device. For example, the color filters are not limited to displaying the three primary colors of red, green, and blue, but may also display one of a cyan, a magenta, a yellow, and a white color.

According to an exemplary embodiment of the present system and method, the plurality of color filters are formed in a stripe form in the vertical direction.

The color filters may be manufactured by a known pigment dispersing method and by using a colored photosensitive organic material.

Although the first and second color filters 700a and 700b adjacent to each other are described for convenience of explanation with reference to FIG. 3, a plurality of other color filters may configured in the same structure.

According to the related art, the first and second color filters 700a and 700b may be spaced apart from each other without forming the color filter overlapped part 710 so as to improve a step. However, such a structure has a problem in which a valley is formed in a spaced portion between the color filters, and a pattern defect is generated due to the substantial thickness of a photoresist that is applied when performing a pixel photolithography process along an inclined surface. As a result, a short circuit may be generated between sub-pixel electrodes 191h and 191l and a shielding electrode 800 or between the sub-pixel electrodes 191h and 191l.

To prevent this problem, a method of forming an organic layer on the color filter may be used. However, this method may cause another step problem.

Therefore, according to an exemplary embodiment of the present system and method, the first and second color filters 700a and 700b are overlapped with each other in boundary regions thereof to form the color filter overlapped part 710 in the vertical (y) direction.

In the present exemplary embodiment shown in FIG. 2, the boundary region of the second color filter 700b is overlapped with the boundary region of the first color filter 700a on the boundary region of the first color filter 700a to form the color filter overlapped part 710. Alternatively, the color filter overlapped part 710 may also be configured in a structure in which the boundary region of the first color filter 700a is overlapped with the boundary region of the second color filter 700b on the boundary region of the second color filter 700b.

As FIG. 2 further shows, while the color filter overlapped part 710 is formed in the second light blocking region, the first and second color filters 700a and 700b are spaced apart from each other in the horizontal (x) direction in the first light blocking region to form the spaced part 720.

The heights of the color filter overlapped part 710, the data line 171, and a light blocking member 900 are main factors in determining a cell gap.

The data line 171 may be formed at a thickness of 7500 Å to improve an RC delay (first Mo=1000, second Al=6000, and third Mo=500), and in the color filter overlapped part 710, a step may be generated by 0.2 µm per overlap of 1 µm, such that a step of 1 µm would be generated in an overlap of 5 µm.

In addition, if the height of the light blocking member 900 is not sufficiently high, the light leakage phenomenon may occur. Therefore, the light blocking member 900 has an appropriate height depending on a transmittance thereof.

Therefore, according to an exemplary embodiment, a three-state overlap in which all of the color filter overlapped part 710, the data line 171, and the light blocking member 900 are overlapped with each other is not generated so as to secure a sufficient cell gap.

Referring to FIG. 4, in the second light blocking region, the data line 171 and the color filter overlapped part 710 are overlapped with each other, such that a two-state overlap is generated, but the three-stage overlap is not generated. Therefore, in the second light blocking region, a sufficient cell gap d4 is secured.

Referring to FIG. 5, in an intersection region of the first light blocking region and the second blocking region, the data line 171 and the light blocking member 900 are overlapped with each other, such that a two-state overlap is generated, but the three-stage overlap is not generated. Therefore, in the first light blocking region, a sufficient cell gap d5 is secured.

Therefore, according to an exemplary embodiment of the present system and method, the light leakage phenomenon may be prevented, and cell gaps of portions other than spacers may be sufficiently secured, such that an active unfilled area (AUA) may be prevented.

A second passivation layer 180b may be positioned on the color filter overlapped part 710. The second passivation layer 180b may be formed of an organic layer or an inorganic layer. If the second passivation layer 180b is formed of the inorganic layer, an effect depending on a step may be expressed well. If the second passivation layer 180b is formed of the organic layer, the layer may be planarized, and another step problem may be caused. In another exemplary embodiment, the second passivation layer 180b may be omitted.

The shielding electrode 800 is formed on the second passivation layer 180b. The shielding electrode 800 is extended in the vertical (y) direction so as to cover the second light blocking region. The shielding electrode 800 may be interposed between the data line 171 and the common electrode 270.

The shielding electrode 800 may be made of a transparent conductive material such as indium tin oxide (ITO), indium zinc oxide (IZO), or the like, or a reflective metal such as aluminum, silver, chromium, or an alloy thereof, or the like.

Since the same voltage level is applied to both the common electrode 270 and the shielding electrode 800, an electric field is not generated between the shielding electrode 800 and the common electrode 270, and thus, the alignment of the liquid crystal molecules positioned between the shielding electrode 800 and the common electrode 270 are not influenced by the electric field. Therefore, the liquid crystal material positioned between the shielding electrode 800 and the common electrode 270 is in a black state, such that it serves as a light blocking member.

Referring to FIG. 3, the shielding electrode 800 may further include an extension part 810 in the horizontal (x) direction in the spaced part 720.

Referring to FIG. 5, the extension part 810 covers a spaced portion of the first and second color filters 700a and 700b to prevent light leakage due to absence of the color filter overlapped part 710 and to prevent imperfection of pixel patterns.

A pixel electrode 191 including the first and second sub-pixel electrodes 191l and 191h is formed on the second passivation layer 180b. The first and second sub-pixel electrodes 191l and 191h are separated from each other with the first and second gate lines 121 and 123 interposed therebetween, are disposed at upper and lower potions, respectively, and neighbor each other in a column direction.

In FIG. 1, an example in which the width of the first sub-pixel electrode 191l in the horizontal (x) direction is wider than that of the second sub-pixel electrode 191h in the horizontal (x) direction is shown. A ratio between these widths may be differently configured depending on an electric field forming ratio. In another exemplary embodiment, the width of the first sub-pixel electrode 191l in the horizontal (x) direction is the same as that of the second sub-pixel electrode 191h in the horizontal (x) direction.

Each of the first sub-pixel electrode 191l and the second sub-pixel electrode 191h generally has a rectangular shape and includes cross-shaped stem parts including horizontal stem parts 193l and 193h and vertical stem parts 192l and 192h intersecting with the horizontal stem parts 193l and 193h, respectively. In addition, the first sub-pixel electrode 191l and the second sub-pixel electrode 191h include a plurality of fine branch parts 194l and 194h, an upper protrusion part 197l, and a lower protrusion part 197h, respectively.

Each of the sub-pixel electrodes 191l and 191h is divided into four sub-regions by the horizontal stem parts 193l and 193h and the vertical stem parts 192l and 192h, respectively. The fine branch parts 194l and 194h are extended obliquely from the horizontal stem parts 193l and 193h and the vertical stem parts 192l and 192h, and a direction in which the fine branch parts 194l and 194h are extended may form an angle of approximately 45 degrees or 135 degrees with respect to the gate lines 121 and 123 or the horizontal stem parts 193l and 193h. In addition, the fine branch parts 194l and 194h of two sub-regions neighboring each other may be orthogonal to each other.

A plurality of first contact holes 185l and a plurality of second contact holes 185l each exposing the wide end portions of the first and second drain electrodes 175h and 175l are formed in the first passivation layer 180a, the color filters 700a and 700b, and the second passivation layer 180b. The first contact hole 185l connects the first sub-pixel electrode 191l and the first drain electrode 175l to each other, and the second contact hole 185h connects the second sub-pixel electrode 191h and the second drain electrode 175h to each other.

It may be more difficult to etch contact holes in the color filters 700a and 700b than in the passivation layers 180a and 180b, depending on the materials of the color filters 700a and 700b. Therefore, the portions of the color filters 700a and 70b at positions at which the contact holes 185h and 185l are formed may be removed in advance at the time of etching the color filters 700a and 700b.

The light blocking member 900 is positioned on the second passivation layer 180b and the shielding electrode 800. The light blocking member 900 may be extended in the horizontal (x) direction so as to cover the first light blocking region. The light blocking member 900 is also called a black matrix. The light blocking member 900 may be formed simultaneously with spacers 510 and 520 using the same material as that of the spacers 510 and 520.

Referring to FIG. 5, first and second spacers 510 and 520 are shown at those locations to be compared with the cell gap d5 but are not limited to those locations. The first and second spacers 510 and 520 may be formed at positions corresponding to the contact holes 185l and 185h but are not limited thereto.

The first spacer 510 may be a main-column spacer, and the second spacer 520 may be a sub-column spacer.

To simultaneously form the light blocking member 900 and the spacers 510 and 520, a two-tone mask may be used, and a half-tone mask and a slit mask may be used as the two-tone mask.

For example, when a negative photoresist is used at the time of forming the light blocking member 900, the light transmittance of a region where the first spacer 510 is to be formed may be set to 100%, the light transmittance of a region where the second spacer 520 is to be formed may be set to 30%, and the light transmittance of regions other than these two regions may be set to 10%. The first spacer 510 may be formed at a position where etching is not made after a photolithography process, the second spacer 520 may be formed at a position where etching is partially made after the photolithography process, and the light blocking member 900 having a height lower than those of the first and second spacers 510 and 520 may be formed in regions other than these positions.

Next, the upper display panel 200 is described. The common electrode 270 may be formed on an upper substrate 210, and an upper alignment layer (not shown) may be formed on the common electrode 270. The common electrode 270 transfers a common voltage.

The liquid crystal layer 3 has a negative dielectric anisotropy, which means that the long sides of the liquid crystal molecules of the liquid crystal layer 3 are aligned perpendicular to the planar surfaces of the two display panels 100 and 200 when an electric field is not present. The liquid crystal layer 3 includes an alignment auxiliary agent including a reactive mesogen, such that the long sides of the liquid crystal molecules are pre-tilted substantially in parallel with a length direction of the fine branch parts 194*a* and 194*b* of the pixel electrode 191. The alignment auxiliary agent is not included in the liquid crystal layer, but may be included in an alignment layer. The liquid crystal layer 3 may also have a positive dielectric anisotropy depending on a liquid crystal mode.

Figure 6:
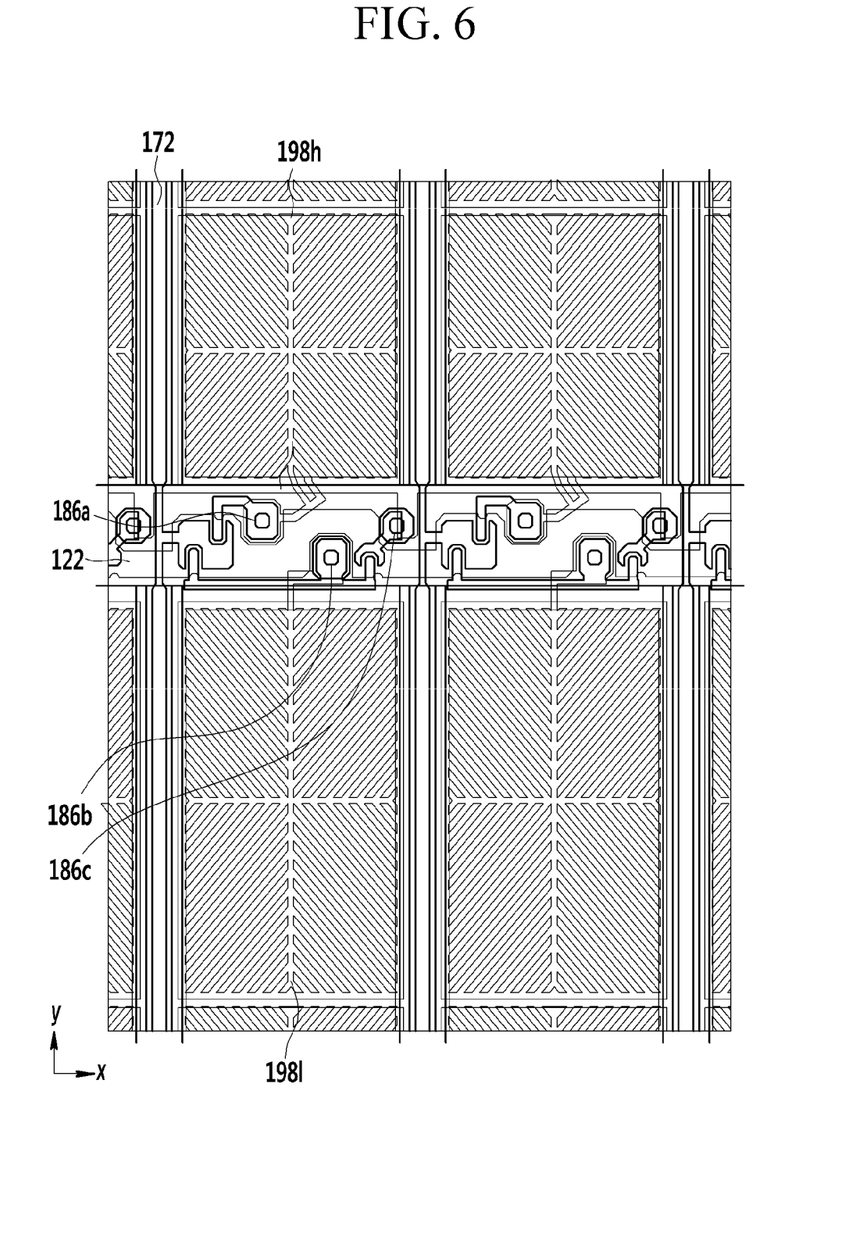
FIG. 6 is a view showing a plurality of pixels of a liquid crystal display device according to another exemplary embodiment of the present system and method.
Figure 7:
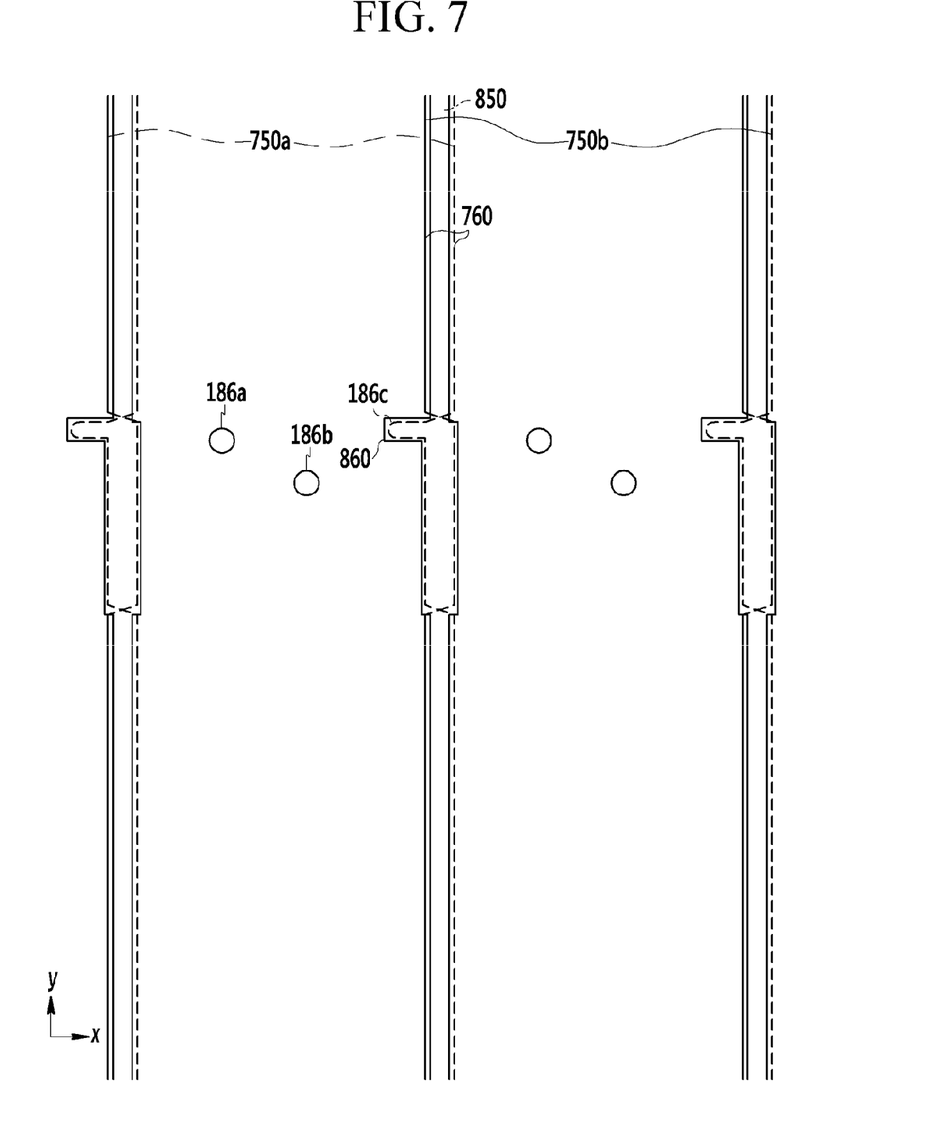
FIG. 7 is a view showing color filters, shielding electrodes, and light blocking members corresponding to pixels of FIG. 6.

FIG. 6 is a view showing a plurality of pixels of a liquid crystal display device according to another exemplary embodiment of the present system and method. FIG. 7 is a view showing structures of color filters and shielding electrodes corresponding to the plurality of pixels.

The basic driving principle of the liquid crystal display device of FIG. 6 is similar to that of the liquid crystal display device described above and includes supplying a data voltage applied through a data line 172 to an upper sub-pixel electrode 198*h* and a lower sub-pixel electrode 198*l* in accordance with a gate signal applied through the gate line 122 to change the alignment of the liquid crystal molecules,.

Although the case in which the width of a color filter overlapped part 760 is wider than that of a shielding electrode 850 is shown in FIG. 7, a width of the color filter overlapped part 760 may be narrower than that of the shielding electrode 850. As described above, since the height of the color filter overlapped part 760 is determined depending on an overlap level between color filters 750*a* and 750*b*, it may be adjusted so as to be appropriate for a manufacturing process.

A stacked structure of a lower display panel according to another exemplary embodiment shown in FIG. 6 is different from that of the lower display panel according to an exemplary embodiment shown in FIG. 1 in that the color filters 750*a* and 750*b* further include a third contact hole 186*c*.

That is, in the exemplary embodiment shown in FIG. 1, the number of contact holes that are to be etched in the color filters 700*a* and 700*b* is two, that is, the first contact hole 185*l* and the second contact hole 185*h*, while, in the exemplary embodiment shown in FIG. 6, the number of contact holes that are to be etched in the color filters 750*a* and 750*b* is three, that is, a first contact hole 186*a*, a second contact hole 186*b*, and the third contact hole 186*c*.

The shielding electrode 850 may be electrically connected to the plurality of transistors of the first light blocking region through the third contact hole 186*c*. The shielding electrode 850 may also be electrically connected to the sustain electrode line to receive the common voltage.

In the present exemplary embodiment shown in FIG. 7, the third contact hole 186*c* covers an extension part 860 of the shielding electrode 850.

Here, the third contact hole 186*c* may be extended from a region where it is overlapped with the extension part 860 to boundary regions of the color filters 750*a* and 750*b*. That is, in an etching process for forming the third etching hole 186*c*, the third contact hole 186*c* may be etched so as to be larger toward the boundary regions than the first and second contact holes 186*a* and 186*b*. As a result, the third contact hole 186*c* configures portions of the boundary regions of the color filters 750*a* and 750*b*.

Therefore, loss of an aperture ratio in terms of a design is minimized, and the shielding electrode 850 extended into the gate region is extended up to the third contact hole 186*c*, such that loss of the aperture ratio due to spacing between electrodes is minimized.

The accompanying drawings and the detailed description are exemplarily provided for the purpose of illustration and do not limit the meaning or the scope of the present system and method. Those of ordinary skill in the art would appreciate that the present system and method include various modifications and other equivalent exemplary embodiments. The scope of the present system and method is defined by the claims.

While the present system and method are described in connection with exemplary embodiments, the present system and method are not limited to the disclosed embodiments. On the contrary, the present system and method cover various modifications and equivalent arrangements included within the spirit and scope of the appended claims.

DESCRIPTION OF SYMBOLS

3: liquid crystal layer
110: first substrate
120: second substrate
171: data line
185*l*: first contact hole
185*h*: second contact hole
270: common electrode
510: first spacer
520: second spacer
700*a*: first color filter
700*b*: second color filter
710: color filter overlapped part
720: spaced part
800: shielding electrode
810: extension part
900: light blocking member

What is claimed is:

1. A liquid crystal display device comprising:
   a first substrate including a first light blocking region where a plurality of transistors are formed and a second light blocking region where a data line is extended in a vertical direction;
   a first color filter and a second color filter formed on the first substrate;
   a second substrate facing the first substrate and having a common electrode formed thereon; and
   a liquid crystal layer interposed between the first and second substrates,
   wherein the first and second color filters are spaced apart from each other in an intersection region of the first and second light blocking regions and are overlapped with each other in the second light blocking region other than the intersection region to form a color filter overlapped part in the vertical direction.

2. The liquid crystal display device of claim 1, wherein: the first substrate further includes a light blocking member extended in a horizontal direction so as to cover the first light blocking region.

3. The liquid crystal display device of claim 2, wherein: the first substrate further includes a shielding electrode extended in the vertical direction so as to cover the second light blocking region.

4. The liquid crystal display device of claim 3, wherein: the shielding electrode is interposed between the data line and the common electrode.

5. The liquid crystal display device of claim 4, wherein: the shielding electrode includes an extension part in the horizontal direction in the region where the first and second color filters are spaced apart from each other.

6. The liquid crystal display device of claim 5, wherein: the first and second color filters each include a contact hole adjacent to the shielding electrode, and the extension part is formed so as to cover the contact hole.

7. The liquid crystal display device of claim 6, wherein: the contact hole is extended from a region where the contact hole is overlapped with the extension part to boundary regions.

8. The liquid crystal display device of claim 6, wherein: the shielding electrode is electrically connected to the plurality of transistors through the contact hole.

9. The liquid crystal display device of claim 2, further comprising:
a first spacer supporting the first and second substrate; and
a second spacer having a height lower than that of the first spacer,
wherein a height of a region of the first substrate where the light blocking member is formed is lower than a height at which the second spacer is formed.

10. The liquid crystal display device of claim 9, wherein: the first spacer, the second spacer, and the light blocking member are made of the same material.

* * * * *